United States Patent

Nordstrom

[15] 3,674,838
[45] July 4, 1972

[54] VINYL CARBAMYLOXY CARBOXYLATES

[72] Inventor: John David Nordstrom, Detroit, Mich.
[73] Assignee: Ashland Oil, Inc., Ashland, Ky.
[22] Filed: June 5, 1969
[21] Appl. No.: 830,880

Related U.S. Application Data

[62] Division of Ser. No. 595,333, Nov. 18, 1966, Pat. No. 3,479,328.

[52] U.S. Cl. .................. 260/482 C, 260/471 R, 260/476 R, 260/479 C
[51] Int. Cl. ...................................... C07c 125/06
[58] Field of Search ............ 260/482 C, 471 R, 479 C, 476 R

[56] References Cited

FOREIGN PATENTS OR APPLICATIONS

| | | | |
|---|---|---|---|
| 510,102 | 1/1955 | Italy | 260/482 |
| 62,684 | 12/1912 | Sweden | 260/482 |

OTHER PUBLICATIONS

Noller, Chem. of Organic Cmpds (2nd Ed.) pp. 310

Primary Examiner—Lorraine A. Weinberger
Assistant Examiner—Paul J. Killos
Attorney—Walter H. Schneider, William Kammerer and Larry W. Evans

[57] ABSTRACT

Unsaturated carbamyloxy carboxylates of the formula:

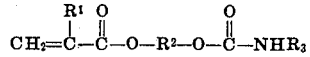

wherein $R^1$ is hydrogen, halogen, or a monovalent hydrocarbon radical of one to eight carbon atoms, and $R^2$ is a divalent hydrocarbon radical of one to 12 carbon atoms, and $R^3$ is a lower alkyl radical of one to eight carbon atoms, or, more preferably, hydrogen. These monomers are useful for preparing a variety of addition polymers.

8 Claims, No Drawings

VINYL CARBAMYLOXY CARBOXYLATES

CROSS REFERENCE TO RELATED APPLICATION

This application is a division of Ser. No. 595,333 filed Nov. 18, 1966, now U.S. Pat. No. 3,479,328, issued Nov. 18, 1969.

This invention relates to novel carbamyloxy carboxylate monomers and methods for their preparation.

The novel carbamyloxy carboxylate monomers of the present invention are illustrated by the following formula:

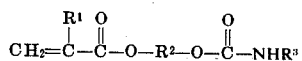

wherein $R^1$ is hydrogen, halogen, or a monovalent hydrocarbon radical of one to eight carbon atoms, and $R^2$ is a divalent hydrocarbon radical of one to 12 carbon atoms, and $R^3$ is a lower alkyl radical of one to eight carbon atoms, or, more preferably, hydrogen. Halogen refers to fluorine, chlorine, bromine, and iodine. Since the presence of a fluorine atom inhibits subsequent addition polymerization, chlorine, bromine, and iodine are the more preferred halogens, and chlorine is the most preferred halogen. Monovalent hydrocarbon radical refers to alkyl, aryl, or aralkyl radicals free of ethylenic unsaturation. These radicals may be substituted with non-interfering substituents such as halogen or nitro groups. Examples of such alkyl radicals include, among others, ethyl, n-propyl, isopropyl, n-butyl, isobutyl, chloropropyl, and nitrobutyl. Examples of such aryl radicals include benzyl and phenylethyl. Divalent hydrocarbon radical refers to divalent alkyl radicals such as methylene, ethylene, propylene, isopropylene, butylene, isobutylene, dodecamethylene, among others, as well as divalent aryl radicals such as ortho-, meta, and paraphenylene and -naphthalene, and divalent aralkyl radicals such as methylphenylene, ethylphenylene, phenylmethylene, and phenylethylene. Lower alkyl radicals refers to methyl, ethyl, propyl, and isopropyl, among others.

Representative specific monomers within the scope of the present invention include:

carbamyloxy methyl acrylate
carbamyloxy methyl methacrylate
carbamyloxy methyl α-chloro acrylate
carbamyloxy methyl α-bromo acrylate
carbamyloxy methyl α-iodo acrylate
carbamyloxy methyl α-fluoro acrylate
N-methyl-carbamyloxy methyl acrylate
N-methyl-carbamyloxy methyl methacrylate
N-methyl-carbamyloxy α-chloro acrylate
N-ethyl-carbamyloxy methyl acrylate
N-ethyl-carbamyloxy methyl methacrylate
N-ethyl-carbamyloxy methyl α-chloro acrylate
2-carbamyloxy ethyl acrylate
2-carbamyloxy ethyl methacrylate
2-carbamyloxy ethyl α-chloro acrylate
2-carbamyloxy ethyl α-bromo acrylate
2-carbamyloxy ethyl α-iodo acrylate
2-carbamyloxy ethyl α-fluoro acrylate
N-methyl-2-carbamyloxy ethyl acrylate
N-methyl-2-carbamyloxy ethyl methacrylate
N-ethyl-2-carbamyloxy ethyl acrylate
N-ethyl-2-carbamyloxy ethyl methacrylate
2-carbamyloxy propyl acrylate
2-carbamyloxy propyl methacrylate
N-methyl-2-carbamyloxy propyl acrylate
N-methyl-2-carbamyloxy propyl methacrylate
N-methyl-2-carbamyloxy propyl α-chloro acrylate N-ethyl-2-carbamyloxy propyl acrylate
N-ethyl-2-carbamyloxy propyl methacrylate
3-carbamyloxy propyl acrylate
3-carbamyloxy propyl methacrylate
N-methyl-3-carbamyloxy propyl acrylate
N-methyl-3-carbamyloxy propyl methacrylate
N-ethyl-3-carbamyloxy propyl acrylate
N-ethyl-3-carbamyloxy propyl methacrylate
N-ethyl-3-carbamyloxy propyl α-chloro acrylate
4-carbamyloxy butyl acrylate
4-carbamyloxy butyl methacrylate
N-methyl-4-carbamyloxy butyl acrylate
N-methyl-4-carbamyloxy butyl methacrylate
N-ethyl-4-carbamyloxy butyl acrylate
N-ethyl-4-carbamyloxy butyl methacrylate
3-carbamyloxy butyl acrylate
N-methyl-3-carbamyloxy butyl methacrylate
N-ethyl-3-carbamyloxy butyl acrylate
N-ethyl-4-carbamyloxy-3-chloro α-benzyl acrylate
N-methyl carbamyloxy-p-phenylene acrylate
3-carbamyloxy-2-nitropropyl α(m-chlorophenyl) acrylate

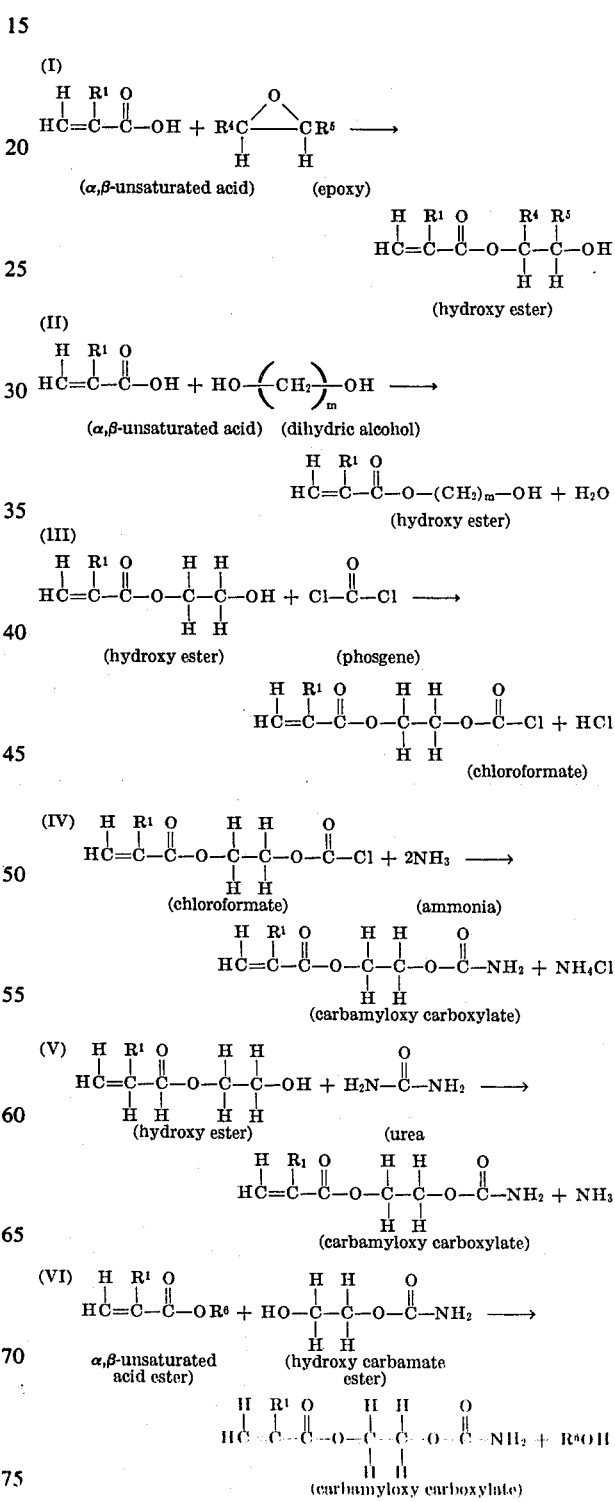

Equations I and II illustrate alternative methods for preparing the hydroxy esters useful in the preparation of the novel monomers of the present invention. Equations III through VI illustrate alternative methods of preparing the novel monomers of the present invention. Equations III and IV together are illustrative of the chloroformate method of preparing the novel monomers of the present invention. Equation V is illustrative of the urea method, and Equation VI is illustrative of the transesterification method of the preparation of the novel monomers of the present invention.

In the method of hydroxy ester formation illustrated by Equation I, an $\alpha, \beta$-unsaturated acid is reacted with an epoxy compound. Examples of suitable $\alpha,\beta$-unsaturated acids include, among others, acrylic acid, methacrylic acid, $\alpha$-ethylacrylic acid, $\alpha$-phenyl acrylic acid, $\alpha$-benzyl acrylic acid, and $\alpha$-chloro acrylic acid. The epoxy compounds which can be used in the reaction of Equation I include the 1,2-epoxy aliphatics such as epoxy ethane, (ethylene oxide), 1,2-epoxy propane, 1,2-epoxy butane, etc., and other epoxy compounds such as trimethylene oxide, 1,3-epoxy butane, 2,3-epoxy butane, $\alpha,\alpha'$-epoxy dibenzyl, and tetrahydrofuran. The 1,2-epoxy aliphatics are preferred because of their greater reactivity. In Equation I, $R^4$ and $R^5$ are meant to define radicals commensurate with the above-described definition of $R^2$. Epoxy ethane is the most preferred 1,2-epoxy aliphatic. The reaction of Equation I can be carried out at conditions well-known in the art.

Hydroxy esters which can be made by the above-described reaction include, among others, hydroxyethyl acrylate, hydroxyethyl methacrylate, hydroxypropyl acrylate, and hydroxypropyl methacrylate.

The hydroxy esters produced in accordance with the reaction of Equation I can be used in the reactions represented by Equations III and V discussed below.

The hydroxy esters can also be prepared by the reaction illustrated by Equation II, wherein the $\alpha,\beta$-unsaturated acid is the same as that employed in reaction I. The dihydric alcohols shown are primary alcohols and have both hydroxyl groups connected to carbon atoms having hydrogen as the only other substituent. Dihydric alcohols having secondary or tertiary hydroxyl groups may also be used but are less preferred since secondary and tertiary hydroxyl groups are less reactive. The hydroxy esters which can be produced by the reaction of Equation II are substantially the same as those that can be produced by the reaction of Equation I described above. The reaction of Equation II can be carried out under conditions well-known in the art.

Equations III and IV taken together are illustrative of the two-step chloroformate method, the preferred method, of producing the novel monomers of the present invention from a hydroxy ester. While any hydroxy ester produced by the reactions illustrated by Equations I and II can be used, for illustrative purposes a hydroxy ester having two carbon atoms is shown. This hydroxy ester can be produced by the reaction of Equation I in which the epoxy compound is epoxy ethane, or by the reaction of Equation II in which the dihydric alcohol is ethylene glycol. In the first step of the chloroformate method, the hydroxy ester is reacted with phosgene to form a chloroformate as shown in Equation III. In the second step, the chloroformate is reacted with ammonia to yield the novel monomers of the present invention as shown in Equation IV. Ammonium chloride is a by-product which, because of its insolubility, is easily removed by filtration.

In the phosgene reaction illustrated by Equation III, an excess of phosgene is preferably employed in order to prevent carbonate formation. The reaction can be carried out in phosgene alone or in an inert solvent such as ethyl acetate, at temperatures between $-20°$ C and $+30°$ C and preferably between $0°$ and $+30°$ C in order to prevent decomposition of the resulting chloroformate.

The hydroxy ester is added slowly to the phosgene which is preferably present in excess to prevent crabonate formation. Twenty to sixty percent excess phosgene has been found suitable. A greater amount of excess phosgene can be used without adversely affecting the reaction, but is undesirable for economic reasons. After completion of the formation of the crude chloroformate, the excess phosgene and solvent, if any, is removed by distillation. The crude chloroformate resulting from the reaction can be reacted further without additional purification, as illustrative by Equation IV.

In Equation IV, which is illustrative of the second step of the chloroformate method of production of the novel monomers of the present invention, as excess of aqueous ammonia is placed in any suitable reaction vessel which is provided with external cooling means in order to remove the heat produced by the exothermic reaction of the chloroformate with ammonia. The chloroformate produced as described above is then slowly added, either alone or in an inert solvent, to the excess ammonia in the reaction vessel while maintaining the temperature between about $-20°$ and $+40°$ C and preferably between about $0°$ and $+25°$ C in order to retard the evaporation of ammonia while permitting the reaction to proceed at an economical rate.

The amount of excess ammonia used as 1.5 to 2.2 and preferably 2.0 to 2.2 moles of ammonia per mole of chloroformate. Greater than 2.2 moles can be used, but the yield of carbamyloxy carboxylate is reduced because of the reaction of ammonia with the unsaturation in the hydroxy ester. Anhydrous ammonia or ammonia dissolved in other suitable solvents can also be used. Aqueous ammonia is preferred because of its ease of handling and because of the use of aqueous ammonia precludes the necessity of pressure vessels attendant with the use of anhydrous ammonia. The above-described chloroformate method of preparation of the carbamyloxy carboxylates of the present invention is simple in operation and results in high yields and represents the preferred method.

In a less preferred embodiment, the chloroformate method may be practiced as a single-step process by mixing the hydroxy ester, the phosgene, and the ammonia; however, the phosgene reacts more readily with the ammonia to form urea and since urea reacts more sluggishly with the hydroxy ester, an overall reduction in rate of reaction results.

The novel monomers of the present invention can also be prepared by the urea method illustrated by Equation V. The hydroxy ester and urea are mixed in substantially stoichiometric amounts and heated to about $120°$ to $140°$ C to yield the carbamyloxy carboxylate. At temperatures below $130°$ C, the reaction proceeds at an uneconomically slow rate and at temperatures above $130°$ C, a hydroxy ester polymerization product forms, reducing the yield of the monomeric carbamyloxy carboxylate. For these reasons, the urea method is not preferred.

The novel monomers of the present invention can also be prepared by the transesterification reaction illustrated by Equation VI. In the practice of this method, an ester of an $\alpha,\beta$-unsaturated acid such as those described above is mixed, either alone or in a suitable inert solvent, with substantially stoichiometric amounts of a hydroxy carbamate ester under conditions well-known in the art for transesterification reactions. The hydroxy carbamate esters employed in this reaction can be manufactured by the reaction of carbamic acid on a suitable diol. However, monohydroxy carbamate esters are difficult to obtain because of the tendency of the carbamic acid to react with both rather than only one hydroxyl group of the diol. In Equation VI, $R^6$ represents any compatible hydrocarbon radical such as lower alkyl, examples of which are methyl and ethyl.

Because of the above-described problems attendant with the preparation of these novel monomers by the urea method illustrated by Equation V and the transesterification reaction illustrated by Equation VI, the chloroformate method illustrated by Equations III and IV together represent the preferred method.

The novel monomers of the present invention can be polymerized either alone or in combination with other vinyl monomers, by bulk, solution, suspension, or emulsion methods according to procedures well-known in the art for the polymerization of α,β-unsaturated acid esters. The carbamate group does not interfere with these procedures. Further details with respect to the preparation of such polymers and the nature thereof are described in the hereinabove cross-referenced application.

The novel monomers of the present invention also find utility as precursors for the production of other useful chemicals, as cross-linking agents for other resins, as precursors for the production of novel and useful polymers, as well as additives to increase the toughness, mar-resistance, adhesion, chemical- and solvent-resistance of other addition polymers.

The invention is further illustrated by the following working examples of the preferred embodiments and in which all parts and percentages are by weight unless otherwise indicated.

EXAMPLE 1

This example illustrates the preparation of 2-carbamyloxy ethyl methacrylate by the chloroformate process. Ethyl acetate (100 ml) is placed in a first flask and precooled to 0° C. Phosgene (150 g) is placed in the flask. 1-Hydroxyethyl methacrylate (130 g) is added dropwise to the above solution over a 2 hour period while maintaining the temperature below about 5° C. After the addition is complete, the solution is allowed to warm to room temperature (20° C) and agitated for 12 hours. The ethyl acetate and excess phosgene are removed by reduced pressure distillation at 15 mm Hg, leaving behind a light yellow liquid containing the chloroformate. Hydroquinone (0.1g) is added to the light yellow liquid and the resulting solution vacuum distilled. The chloroformate distills at 86° to 90° C at 1 mm of Hg pressure.

Concentrated ammonium hydroxide (31 g) having approximately 29.5 percent NH₃ is cooled in a second flask to 5° C. The chloroformate (50 g) dissolved in ethyl acetate (50 ml) is then added dropwise to the second flask over a period of 2 hours while maintaining the temperature below 10° C. After addition is completed, the mixture is warmed to room temperature (20° C) and then filtered to remove the by-product, ammonium chloride. After filtration, the ethyl acetate layer is separated from the water layer. The ethyl acetate portion is vacuum distilled, leaving a colorless oil (45.6 g). The colorless oil is stirred in a large excess of hexane and the 2-carbamyloxy ethyl methacrylate is thus isolated. This monomer is insoluble and solidifies into a white solid (30 g). To obtain a purified product, the white solid was recrystallized from hexane. This purified monomer melted at 46° to 47° C. A liquid methacrylic ester, which is hexane-soluble, is a by-product of the above reaction.

EXAMPLE 2

Following substantially the procedure of Example 1, 2-carbamyloxy ethyl acrylate is prepared from 2-hydroxy ethyl acrylate. The 2-carbamyloxy ethyl acrylate copolymerizes readily with equal weights each of methyl methacrylate, butyl acrylate, and styrene.

EXAMPLE 3

Following substantially the procedure of Example 1, 4-carbamyloxy butyl methacrylate is prepared from 4-hydroxy butyl acrylate. The 4-carbamyloxy butyl methacrylate polymerizes readily with equal weights each of methyl methacrylate, butyl acrylate, and styrene.

EXAMPLE 4

Following substantially the procedure of Example 1, 4-carbamyloxy butyl acrylate is prepared from 4-hydroxy butyl acrylate. The 4-carbamyloxy butyl acrylate polymerizes readily with equal weights each of methyl methacrylate, butyl acrylate, and styrene.

What is claimed is:

1. A carbamyloxy carboxylate having the general formula:

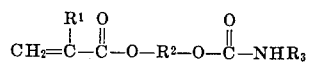

wherein R¹ is hydrogen, a monovalent alkyl, aryl or aralkyl hydrocarbon radical, or halo-or nitro-substituted alkyl, aryl, or aralkyl hydrocarbon radical free of ethylenic unsaturation of one to eight carbon atoms, or a halogen; R² is a divalent hydrocarbon radical of one to 12 carbon atoms; and R³ is hydrogen or a lower alkyl radical of one to eight carbon atoms.

2. A carbamoyloxy carboxylate according to claim 1 wherein R¹ is a monovalent alkyl, aryl, or aralkyl hydrocarbon radical.

3. The carbamyloxy carboxylate of claim 1, wherein R¹ is hydrogen or a lower alkyl radical, R² is an alkylene radical, and R³ is hydrogen.

4. The carbamyloxy carboxylate of claim 3, wherein R² is ethylene.

5. 2-Carbamyloxy ethyl acrylate according to claim 1.
6. 2-Carbamyloxy ethyl methacrylate according to claim 1.
7. 4-Carbamyloxy butyl acrylate according to claim 1.
8. 4-Carbamyloxy butyl methacrylate according to claim 1.

* * * * *